United States Patent
Filatov

(10) Patent No.: US 10,430,271 B1
(45) Date of Patent: Oct. 1, 2019

(54) DYNAMIC REJECT RATE ADJUSTMENT TO OPTIMALLY PROCESS UNEVEN FLOW OF DOCUMENTS WHILE MAINTAINING AVERAGE ERROR RATE RESTRICTION

(71) Applicant: Parascript, LLC, Longmont, CO (US)

(72) Inventor: Alexander Filatov, Longmont, CO (US)

(73) Assignee: Parascript, LLC, Longmont, CO (US)

( * ) Notice: Subject to any disclaimer, the term of this patent is extended or adjusted under 35 U.S.C. 154(b) by 0 days.

(21) Appl. No.: 16/431,552

(22) Filed: Jun. 4, 2019

Related U.S. Application Data

(63) Continuation of application No. 16/430,074, filed on Jun. 3, 2019.

(51) Int. Cl.
*G06F 11/00* (2006.01)
*G06F 11/07* (2006.01)

(52) U.S. Cl.
CPC ........ *G06F 11/0793* (2013.01); *G06F 11/076* (2013.01); *G06F 11/079* (2013.01); *G06F 11/0721* (2013.01)

(58) Field of Classification Search
CPC ............... G06F 11/076; G06F 11/0793; G06F 11/0751; G06F 11/079
See application file for complete search history.

(56) References Cited

U.S. PATENT DOCUMENTS

| | | | | |
|---|---|---|---|---|
| 6,345,375 B1* | 2/2002 | Kelkar | ...................... | H04L 1/18 714/748 |
| 2007/0124625 A1* | 5/2007 | Hassan | ................... | H04L 1/002 714/704 |
| 2010/0124887 A1* | 5/2010 | Wellington | ........... | H04L 1/0016 455/69 |
| 2012/0147930 A1* | 6/2012 | Miyoshi | ................. | H04B 7/026 375/211 |
| 2012/0269076 A1* | 10/2012 | Lenaerts | ................ | H01Q 21/28 370/252 |

* cited by examiner

*Primary Examiner* — Charles Ehne
(74) *Attorney, Agent, or Firm* — Merchant & Gould P.C.

(57) ABSTRACT

Systems and methods herein can compensate for higher demand on computing processing functions by changing required error rates for error-controlled processes. Thus, the systems and methods maintain an average error rate over a time division. By adjusting the error rate and throughput within different time subintervals of the time division, the systems and methods can maintain an average error rate for the complete time division but adjust the throughput during smaller portions the time division. In other words, while maintaining the amount of processing capacity, the length of the time division, and the average error rate over the time division, but changing the error rate in smaller portions of the time division, the systems and methods can adjust the amount of total throughput during high demand periods for the processing function.

20 Claims, 9 Drawing Sheets

DYNAMIC REJECT RATE ADJUSTMENT TO OPTIMALLY PROCESS UNEVEN FLOW OF DOCUMENTS WHILE MAINTAINING AVERAGE ERROR RATE RESTRICTION

CROSS-REFERENCE TO RELATED APPLICATIONS

This application is a continuation of U.S. application Ser. No. 16/430,074, filed Jun. 3, 2019 and titled "DYNAMIC REJECT RATE ADJUSTMENT TO OPTIMALLY PROCESS UNEVEN FLOW OF DOCUMENTS WHILE MAINTAINING AVERAGE ERROR RATE RESTRICTION," the disclosure of which is hereby incorporated herein by reference.

BACKGROUND

Several automated computer processing functions require adjustability in the amount of throughput so that the functions can meet variable demand. One exemplary processing function is the scanning of hand-written portions of a document, for example, digitizing mailing or shipping labels. In certain applications concerning such document processing, the demand for the document processing may be unevenly distributed over time. For example, with mail or parcel processing, the volume of mail and parcels spikes in the month before Christmas, with an especially heavy spike in volume in the final week before Christmas. Thus, the demand for the digitization of mailing labels has a concomitant spike in demand during these times. In another example, digitizing the hand written portions of insurance claims has an increase in demand based on an increase in volume of claims filed on Monday, which volume may be much higher than during other days of the week.

Generally, processing of documents can involve both automated processing, such as processing by a document capture software, and possibly manual processing which deals with data elements rejected by the software. The manual processing may entail a human reading the document to determine how a field or document should be interpreted.

An uneven flow of documents or uneven demand creates an issue in resource allocation. In the example of parcel delivery, parcel delivery companies may have to hire many temporary workers during Christmas season. For insurance companies, additional resources may be needed every Monday. However, it is difficult for users to hire more workers or apply additional resources for specific times only. Therefore, the uneven flow of documents or uneven demand can lead to significant inefficiencies for such users, especially in cases when a process requires a short turnaround, for example 24 hours or less turnaround time.

SUMMARY

Systems and methods herein can compensate for higher demand on computing processing functions by changing required error rates for error-controlled processes. Thus, the systems and methods that maintain an average error rate over a time interval can be adjusted to increase throughput. By adjusting the error rate and throughput within different time subintervals of the time interval, the systems and methods can maintain an average error rate for the complete time interval but adjust the throughput during smaller portions of time during the time interval by having more outputs with potential errors. In other words, while maintaining the amount of processing, the time interval, and the average error rate over a time division, but changing the error rate in smaller portions of the time interval, the systems and methods can adjust the amount of total throughput during high demand periods for the processing function.

BRIEF DESCRIPTION OF THE DRAWINGS

Non-limiting and non-exhaustive examples are described with reference to the following figures.

DETAILED DESCRIPTION

Figure 1:
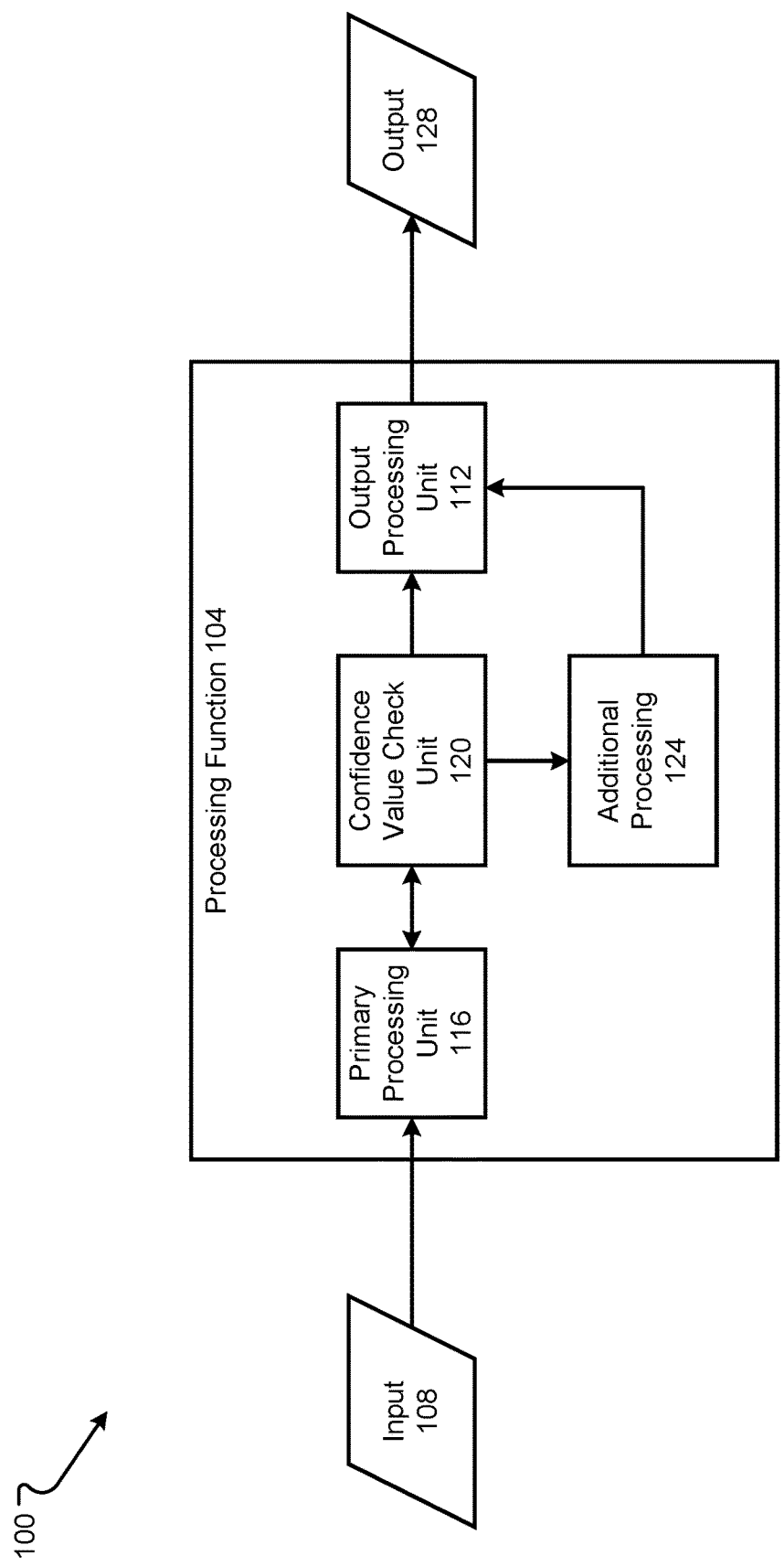
FIG. 1 illustrates a system for controlling the resources and throughput of a process based on changing an error rate in accordance with the aspects of the disclosure.

Various types of processing described herein can be conducted by a computer system or by a computer system possibly with some human involvement. The processing can be governed by various controls. One such control is the set error rate. Processes controlled or governed by a predetermined error rate may be referred to as an error-controlled processes. If errors do occur in an error-controlled process, such errors may lead to further processing in the processing workflow, and thus, the processing becomes less efficient as errors occur. The errors that lead to additional processing are usually associated with additional costs, whether to the business or as additional load on the processing hardware which necessitates leasing or buying additional computing resources.

Error rate restrictions are usually introduced and predetermined by users, and compliance with such restrictions is monitored as an essential part of the process. Methods of error rate monitoring depend on the particular workflow. One of the most popular methods of implementing error rate control in some processing workflows is to use additional processing, which may occur after or in parallel with the workflow processing, and some of that additional processing may involve human intervention. The error is discovered from a comparison of the result of the task from the automated process and from the additional processing. The difference in results between the initial processing and those inputs that require additional processing provides a reasonably accurate estimate of the error rate. In some circumstances, an error may not be discovered until further downstream, for example, by a customer of the process complaining about the error or from some balancing process or inspection.

Given that manual entry is relatively expensive, it is usually beneficial to use manual entry only for a small portion of inputs (e.g., documents). In many circumstances, it may take several days of processing to gather the amount of data which would allow the opportunity to estimate the error rate reliably. Such a frequency of error rate monitoring is usually acceptable.

Herein, the error-controlled processes may receive an input (e.g., a document, an image, an audio file, a video file, etc.) as an input and then provide a result (e.g., a recognized value of a required data field in the document, an identification of a person in a picture or video, etc.) as the output. Often, each result or a portion of the result (e.g., a data field in a document) is accompanied by a confidence value (CV). Such CV characterizes the confidence in the accuracy of the result in the output. A higher confidence value usually correspond to predicted lower error rates of the output.

The CV can be used to accept outputs with a confidence value higher than a certain threshold, and to reject other output fields, which can lead to routing such rejected results for reprocessing, additional processing, manual processing, etc. The higher the threshold the lower the corresponding error rate, and the higher the reject rate the more data elements that will require additional processing and lower the throughput. The confidence value threshold is usually chosen to restrict the error rate to a required level. A user is usually interested in restricting the error rate as an average error rate over a time division (e.g., every week, every month, every year, etc.). The average error rate may be checked, for example, on a weekly basis.

Many of these error-controlled processes are subject to uneven demand or volume. In other words, the number of inputs into the process changes based on a time period within the time division. To address the problem of uneven volume or demand and to change the number of rejected data elements that require additional processing, the methods and systems herein can change particular parameters and process controls to adjust the volume of rejected data elements with the goal to reduce the volume of rejected data elements during the time when maximum volume of inputs has to be processed, and, maybe, to increase the volume of rejected elements during other time periods to maintain the required average error rate.

The following description provides the mathematical explanation of the changes to the process. First, the system and method select a time division or time interval (t) and apportion the time interval into distinct (and, in some configurations, uniform) time periods or subintervals. Each input into the process can have a statistically known or predicted volume of data inputs or tasks to be processed. In other words, the type and amount of processing on an input is generally known based on past processing requirements, as provided in the following equation:

$$t=[t1,t2,\ldots tn],(V1,V2,\ldots Vn)$$

In the equation above, "n" equals the number of time periods or subintervals in the time division or time interval. For example, $t1, \ldots, tn$ may correspond to work days in the time division of a week. V1 through Vn corresponds to the statistically-determined or statistically-predicted volumes (based on past processing requirements during the same time division and/or time period) of processing required during these associated time periods.

Now, "C" can correspond to the confidence value. "E(C)" can be an error rate function, and "R(C)" can be a reject rate function. In many configurations, the E(C) and R(C) functions can be calculated in a tabular form for a selected number of confidence values C1, C2, . . . Cm (for example, if a confidence value is defined as integers in the range of [0,100] then the E(C) and R(C) functions can be calculated for confidence values Ci, where i=(0, 1, 2, . . . , 100).

To determine an accepted or a rejected result from the process, the confidence value is compared to a selected confidence value threshold. The confidence value threshold can be uniform for all portions analyzed in the result of the process or different confidence value thresholds may be associated with different portions of the result. The threshold(s) may be chosen to restrict the process to an overall error rate or error rates for results, which confidence value thresholds may be predetermined by a user. Further, the confidence value thresholds may be constant over a time division and/or time period.

The methods and systems herein can dynamically adjust the confidence value thresholds, at different time moments. For example, assume that t1 is a time period with the largest volume V1 of inputs (for example, t1 is the time period with the greatest demand on the process), t2, . . . , tn are other time periods with the smaller same volume V2. Now, the methods and systems determine two confidence value thresholds, C1 for time period t1, and C2 for time periods t2, . . . tn. An initial confidence value threshold C0 may be defined initially by the software. Total volume for the overall time division will be:

$$V=V1+V2*(n-1)$$

The constrained optimization problem must minimize:

$$R(C1)*V1$$

However, this reject rate for a first time period is subject to maintaining an average error rate over the time division, which is provided as:

$$(E(C1)*V1)+(E(C2)*(V-V1)\leq E(C0)*V$$

Given that the goal of the optimization problem is to minimize the reject volume to be processed over any of the $t1, \ldots tn$ time periods, the reject volume of the second time period (and, correspondingly, each of the other time periods) must be not more than the reject volume of the first time period according to the following:

$$R(C2)*V2\leq R(C1)*V1$$

This optimization problem can be solved by a number of methods as understood by one skilled in the art. For example, one of the simplest methods to solve the constrained optimization problem above, under certain assumptions, is by exhaustive search. Here, functions E(C) and R(C) are given in a tabular form, and defined for a set of confidence values, for example the confidence values can be a set 0, 1, . . . , 100. All possible pairs of C1, C2 have corresponding values of functions E(C1), E(C2), R(C1), R(C2). For each pair of C1, C2, which satisfies the constraints provided above, it is possible to calculate the value of R(C1)*V1, and then take a minimum of all such values.

It is also possible to formulate a constrained optimization problem in a more general way for any number of time periods in the time division:

Minimize Max($R(C1)*V1, \ldots R(Cn)*Vn$)

These reject rates are similarly subject to:

$(E(C1)*V1)+(E(C2)*V2)+ \ldots (E(Cn)*Vn) \leq E(C0)*V$

The constrained optimization problem above can again be solved by one of the various methods known to one skilled in the art, as explained above.

Other optimization approaches are also possible. For example, it is possible to approximate tabular functions E, R by analytical functions, for example, with polynomial approximation. It should also be noted that the methods and systems can also be applied in cases when the recognition software is not utilized. To control manual data entry error rates, such methods as double data entry and triple data entry are used, instead of or in combination with a single data entry. Therefore, for manual data entry, the methods and systems may define the rejection of a field as a request for double or triple data entry. Then, assuming this control, it is possible to calculate error rate and reject rate functions as functions of a percentage of volume of process results routed for double or triple keying. In such an environment, the methods and systems described herein can be applied for optimization of the manual data entry process.

A system 100 for conducting resource balancing, as described above, may be as shown in FIG. 1. The system 100 may have a processing function 104, which may be executed within a processor or other computing system, such as a server or cloud resources, as described in conjunction with FIGS. 7, 8. The processing function 104 can conduct some type of an error-controlled process. As described above, an error-controlled process is a process that must meet a predetermined error rate. This error rate may be determined or established by customer input or by other requirements. An error rate can be a frequency of any type of error associated with the processing, for example, a misidentified address on a package, an incorrect name on an insurance form, a misidentified person during facial recognition, a misidentified word during speech recognition, etc.

The types of error-controlled processes may include, but are not limited to: computing processes, for example, optical character recognition by computers, text processing by computers, voice recognition by computers, face recognition by computers, or other types of analysis or recognition of printed material, audio, video, etc. conducted at least partially by computers. While these processes are exemplary, an error-controlled process may include other processes conducted solely by a computer processor and by a computer processor and at least partially by human participants.

Typically an error results by a process providing a result that is not accurate enough. Accuracy may be estimated, by the computer process, by providing a confidence value with a result. For example, with optical character recognition, the error-controlled process may provide the result of a digitized version of written text and/or other information. This result may include a confidence value or a measure of how accurate the computer believes the result is based on and compared to the input of the original handwritten text and/or other information. If a confidence value is not high enough, meaning the computer processor was not sure that the computer process made an accurate result, this processing with a lower confidence value may result in an error more frequently. To determine if the result should be rejected, the processor may use a confidence value (CV) check unit 120 and compare the confidence value to a predetermined threshold. This check may be as explained in conjunction with FIG. 2B and FIGS. 5 and 6 hereinafter.

The processing unit 104 can receive inputs 108 into the error-controlled process. As explained in the examples above, these inputs 108 can include such things as handwritten text, voice or audio inputs, video inputs, etc. The inputs are not so limited and there may be other types of inputs as required by the type of processing to be done. The processing unit may be any type of computer resource as described in conjunction with FIGS. 7 and 8. These inputs may be provided to the processing unit 104 for analysis by primary processing function 116.

Figure 2A:
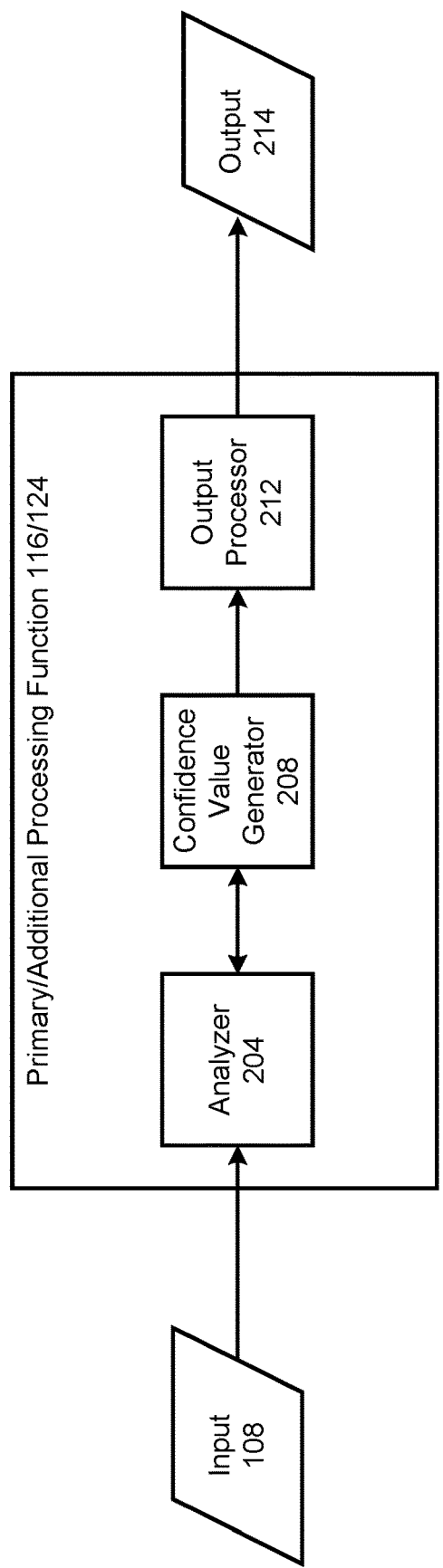
FIG. 2A illustrates a primary or additional processing function that conducts an error-controlled process in accordance with the aspects of the disclosure.
Figure 5:
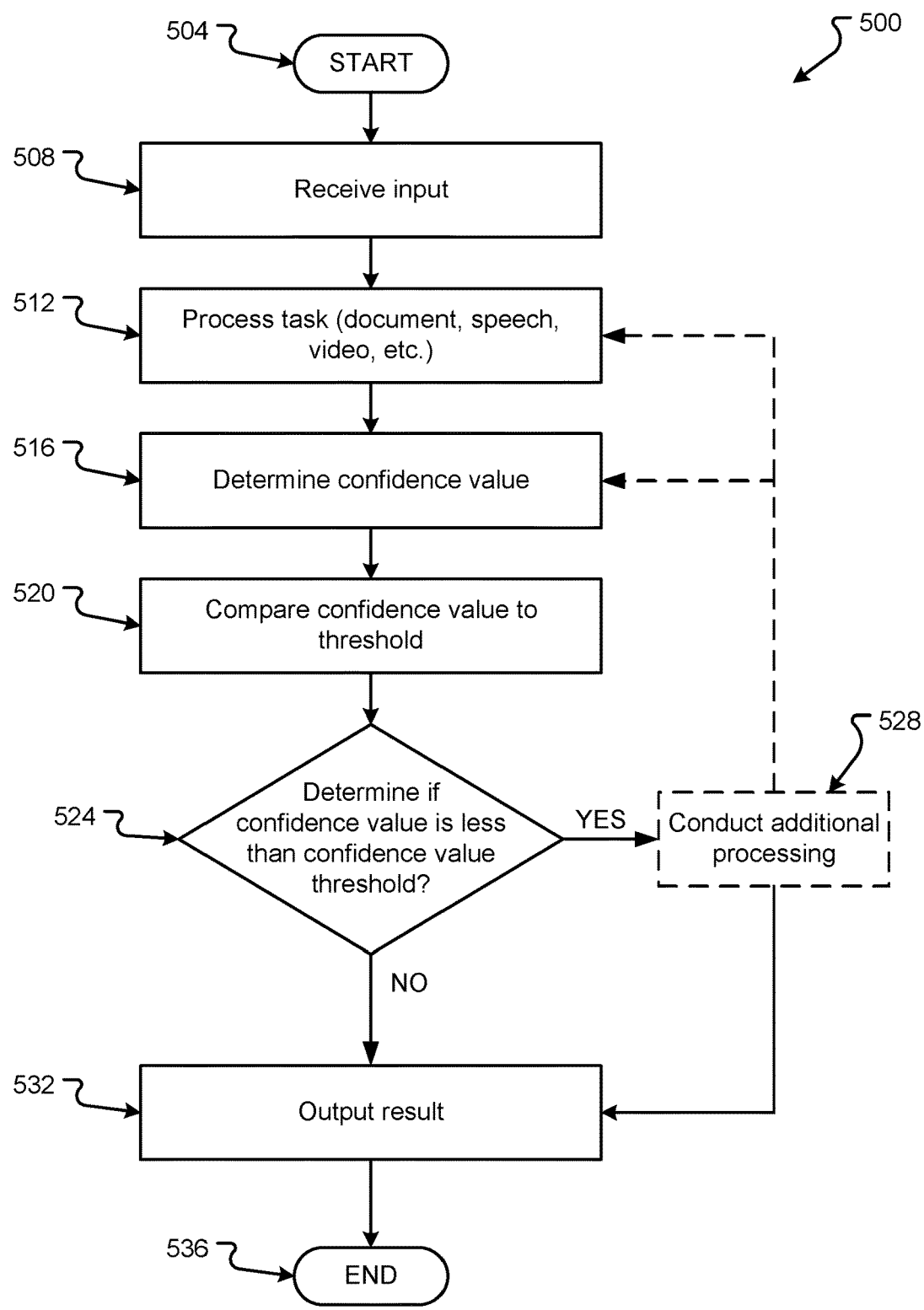
FIG. 5 illustrates a method for conducting an error-controlled process in accordance with the aspects of the disclosure.
Figure 6:
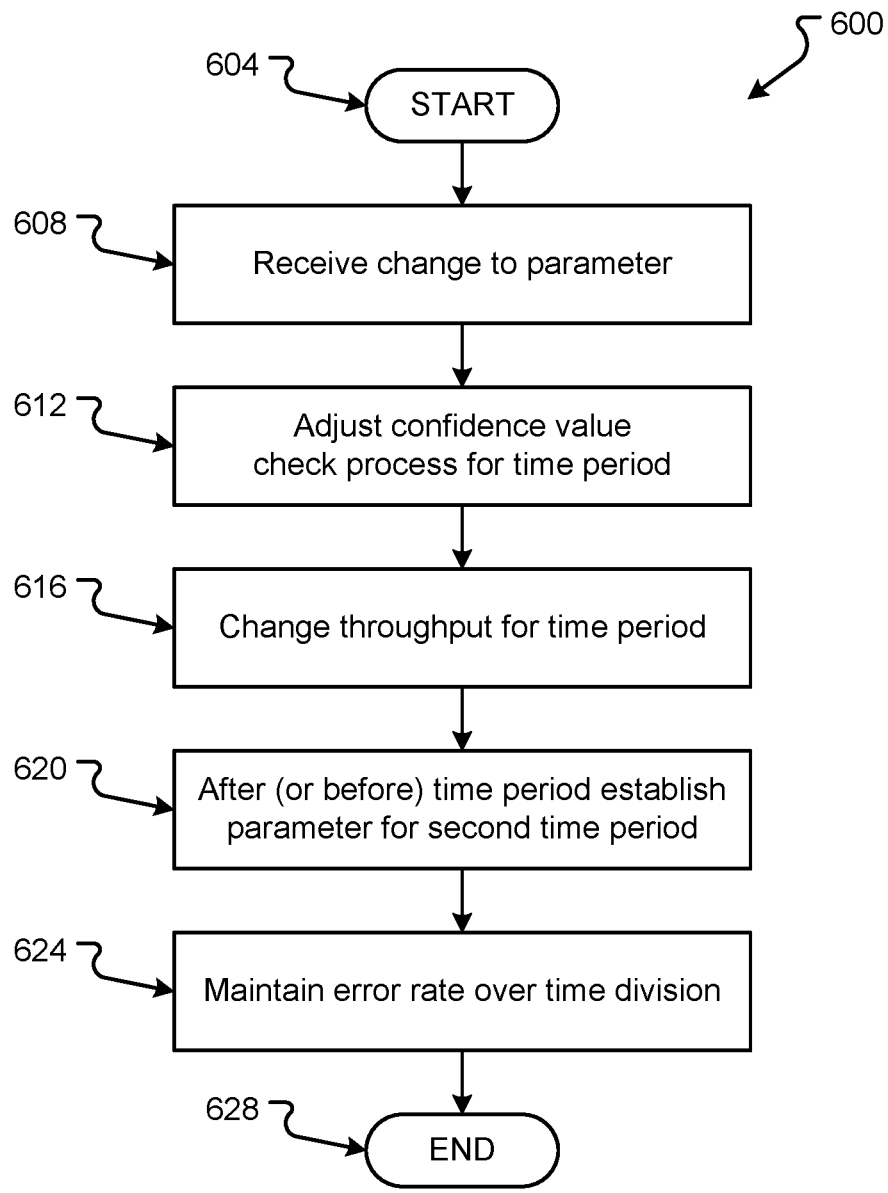
FIG. 6 illustrates a method for adjusting the throughput of an error-controlled process in accordance with the aspects of the disclosure.

The primary processing function 116 may be as explained in conjunction with FIG. 2A and thereinafter in FIGS. 5 and 6. The primary processing function 116, as explained previously, can provide a result and a confidence value. The type of processing completed by the primary processing function 116 may be determined by the type of input and by the requirements of the user. Generally, the primary processing function 116 conducts some type of analysis on the input to generate the result or output. This result and a confidence value may be provided to a CV check unit 120.

The CV check unit 120 can determine whether the result is acceptable from the primary processing function 116. The operation of the CV check unit 120 may be as described in conjunction with FIGS. 2B, 5, and 6, described hereinafter. Should such output result in a low confidence value, the CV check unit 120 may provide the result, input, and the confidence value to an additional processing unit 124 or back to the primary processing unit 116. If sent back to the primary processing function 116, the primary processing unit 116 may reprocess the input to better achieve a result that will have a better confidence value. The additional processing unit 124 may go through other analyses or may use different resources to try to provide an output that is acceptable, is less likely to include an error, and has a higher confidence value. With the text recognition example, the additional processing 124 may include a human being or another processing computer or resource reevaluating the input to determine how to digitize that input properly.

When a result has a high enough confidence value, either through the primary processing unit 116 or the additional processing unit 124, an output is provided to the output processing unit 112. The output processing unit 112 can be any type of function that provides the output 128 to a separate system, unit, or function or can just provide this output 128 to a human through a display, printer, etc. Thus, the output processing 112 can include any kind of communications or interface required to provide the output 128 to some other function.

The processing unit 104 may have some constraints. For example, the processing unit 104 may only have a set amount of resources to conduct the processing. Thus, to provide a result through to the output processing 112, there may be no change in processing capacity to do the additional processing 124 or reprocessing of failed analyses at the primary processing unit 116. Thus, for this type of error-controlled process, there may be no option to affect the amount of capability or capacity of a processor or system to compensate for higher chances of errors in the output or higher volumes.

Further, the confidence value threshold used by the CV check unit 120 may be adjustable. Adjusting the error rate desired can modify the confidence value threshold, which can provide greater throughput through the processing unit 104 without adjusting the amount of capacity of the resources of the processing unit 104. Thus, as the error rate is increased (meaning the number of predicted errors increases), the throughput increases, and vice versa.

Still further, the average error rate may need to be maintained over some time division or time division. As explained previously, the time division can be, for example, one week, one month, one year, etc. The time division must maintain an average error rate over the entire time division, as required by the user or process interface in communication with the output processing unit 112. The time division may further be portioned into time periods. For example, if the time division is one week, the time periods may be each day within that week.

Each time period may have a different demand upon the processing unit 104. For example, the processing unit 104 may receive 50% of all inputs 108 in a time division, into the processing unit 104, on the first day, of the time division, of a week. The rest of the 50% of inputs 108, during a time division, may then be spread over the last six days of time periods within that time division. Thus, the processing unit 104 is affected by non-uniform demand upon the processing unit's capacity. Without the ability to increase the processing resources or moving demand to another day (possibly because of the turnaround requirements) as described below, the processing unit 104 may be unable to process all inputs during one time period as compared to other time periods. Thus, to compensate for this change or variation in demand, the processing unit 104 may need to increase throughput during those periods.

Further constraints in the processing function 104 can include a requirement for a predetermined turnaround (the amount of time from receiving the input 108 to providing the output 128) of the analysis conducted by the processing unit 104. For example, any input into the processing unit 104 may need to be completed and produce the output 128 during the time period (e.g., turnaround of one day). As such, if there is a stringent turnaround requirement and new resources are not available, the system 100 may be unable to do additional processing 124 if the additional processing 124 will take longer than that time period allotted for the turnaround. Thus, the processing function 104 may be constrained and may still need to meet the demand, the turnaround requirements, the error check requirements, etc.

In this environment, the processing unit 104 may then need to adjust the throughput through the primary processing unit 116 and CV check unit 120 to meet these different demands and/or turnaround requirements. In such a system 100, the error rate can be increased to produce fewer rejections at the CV check unit 120, which creates a higher throughput. To accomplish this adjustment, the increase in the error rate may require a lowering of the predetermined confidence value threshold, at least for some portion of the time division (e.g., a portion of the time periods in the time division or time interval), when checking a confidence value to that confidence value threshold, as described above. In this way, the throughput increases, but the possibility of errors also can increase.

However, in the other time periods with lower demand, this error rate may be decreased below the normal average across one or more time period(s) to try to compensate for the increase in errors that may have happened in a previous or subsequent time period that has a higher demand and requires increased throughput. Thus, the optimization problem described above warrants less throughput and a lower error rate in the periods that do not need higher throughput. In this way, the error rate average over the time division meets the required predetermined objective while also increasing throughput during high demand times, but decreasing throughput and decreasing potential errors during time periods when demand is lower and additional processing resources, which correct for possible errors, may be available due to the lower demand.

It should be noted that the system 100 does not inspect the result for errors. Rather, the error rate is associated with what is predicted in the result. Thus, the error rate is an estimation or prediction of the number of errors in the output result based on analysis of past processing and past results. An output that has a confidence value above the threshold may still have an error, and an output that has a confidence value below the threshold may not have an error. The confidence value and confidence threshold simply provide a way of estimating if the output is likely to have an error. Thus, changing the confidence value threshold helps increase throughput but any errors in the results are passed to the downstream processes rather than being discovered by the system 100.

An embodiment of the primary processing/additional processing functions 116/124 may be as shown in FIG. 2A. The processing functions 116/124 can include an analyzer 204 that conducts some type of analysis. The processing functions 116/124 can also include a confidence value generator tool 208 and some type of output processor 212.

The analyzer 204 is the unit that conducts the type of analysis as explained above. For example, the analyzer 204 can conduct optical character recognition, voice recognition, face recognition, etc. This analysis provides an output or result. For example, the analyzer 204 may produce a digitized mailing label, a digitized insurance form, an identity derived from facial recognition, a word(s) or phrase(s) generated from speech recognition, etc.

The confidence value generator 208 can measure an accuracy or perceived accuracy of the result provided by the analyzer 204. Using the result itself and additional output information associated with the result, for example, as estimated probability values, numerical scores or other values associated with the result, and using heuristics or other algorithms as understood in the art to process both the result and the associated values, the confidence value generator 208 can determine how sure the analyzer 204 is of the result. The CV can be generated based on statistical correlation to past results with similar attributes with the input 108 or result as having been generated in the past (of which a known number of errors were witnessed). This confidence value generator 208 can provide the result from the analyzer 204 and the confidence value to the output processor 212.

Figures 3A, 3B:
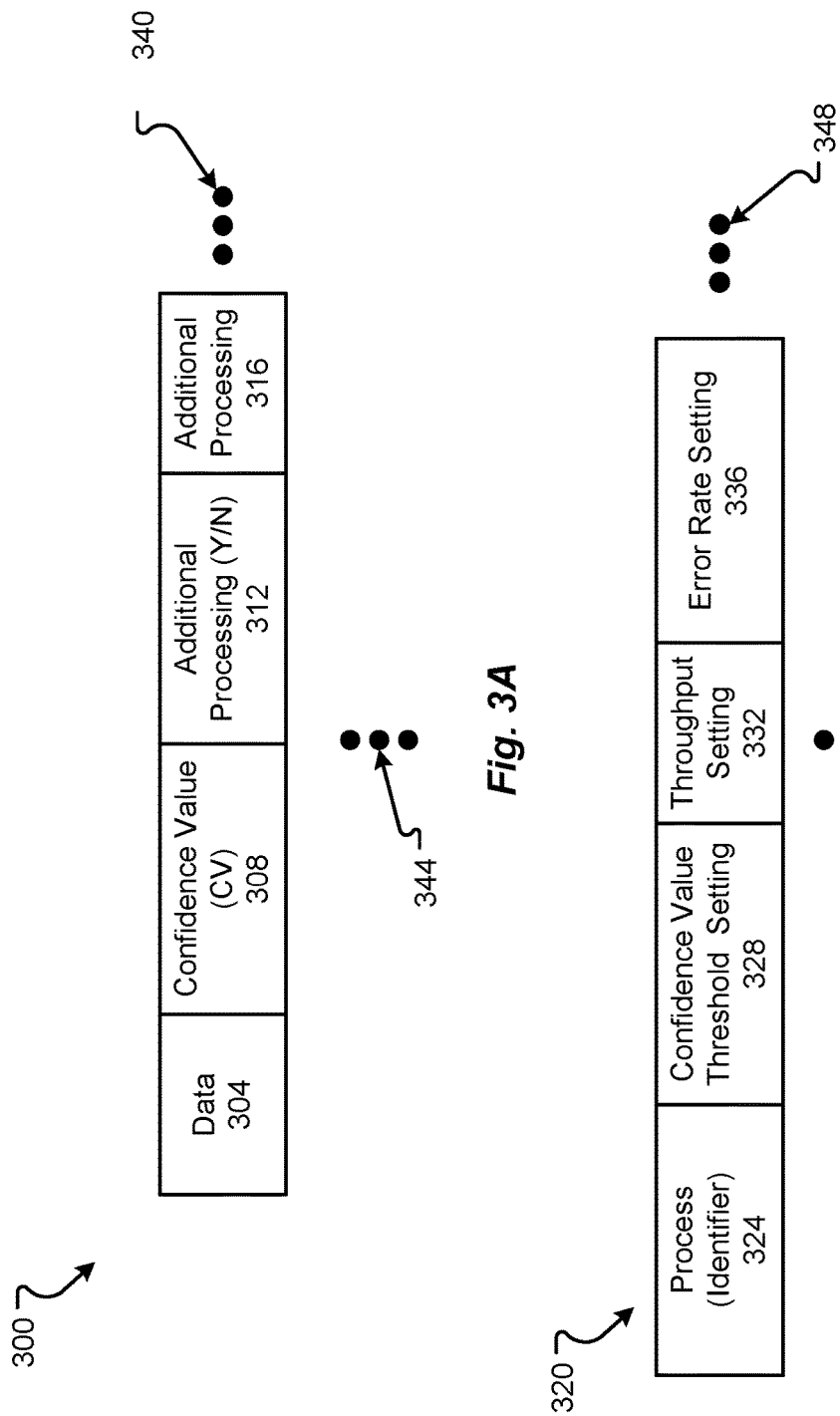
FIG. 3A illustrates a data structure that stores a result and associated metadata for an error-controlled process in accordance with the aspects of the disclosure.
FIG. 3B illustrates a data structure that stores parameter data that controls the error-controlled process in accordance with the aspects of the disclosure.

The output processor 212 may place the resulting confidence value and/or result into a data packet, similar to that shown in FIG. 3A, for provision to the CV check unit 120. Thus, the output processor 212 is operable to packetize or provide the data (result from the analyzer 108 and the CV from the CV generator 208), with a predetermined format and form as required by the CV check unit 120.

Figure 2B:
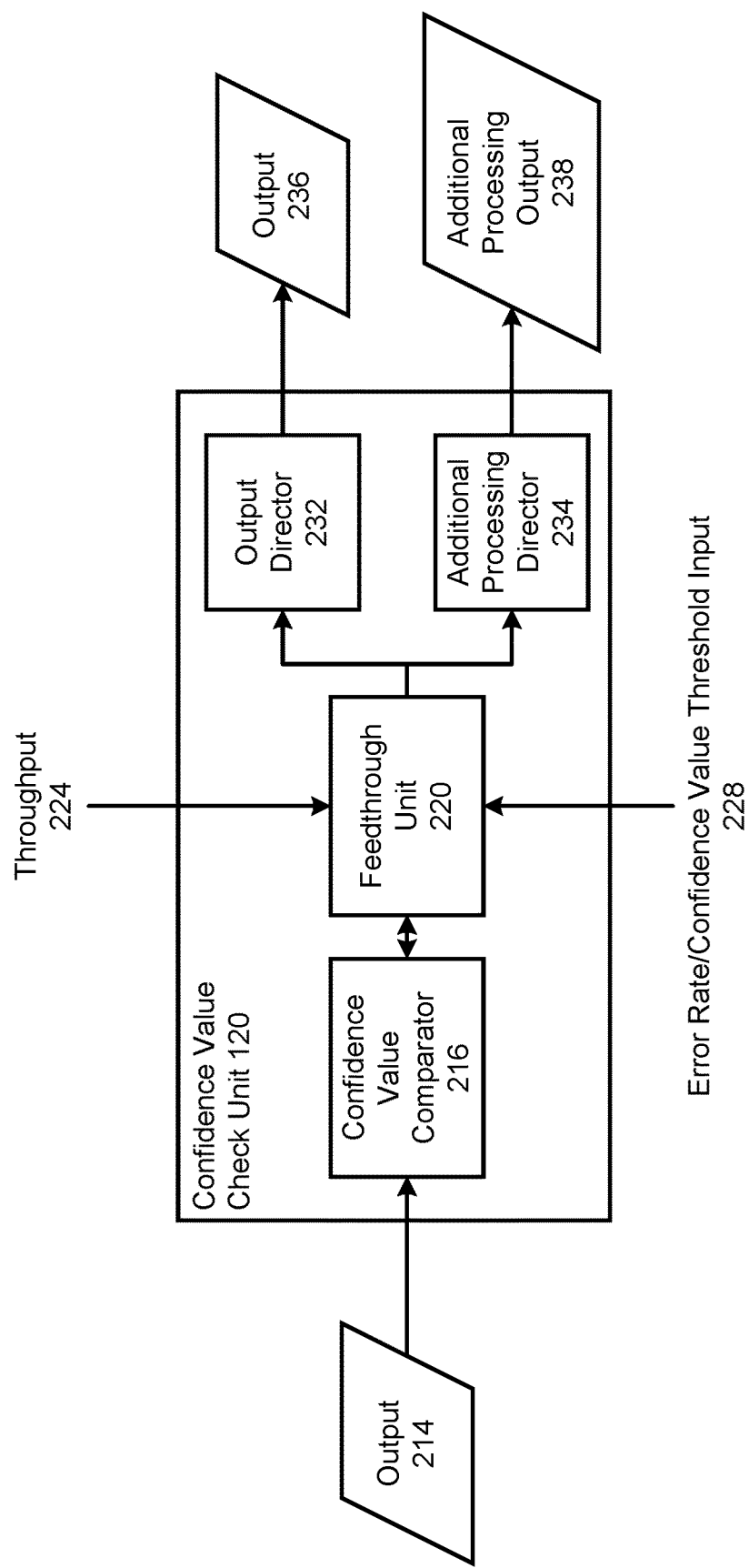
FIG. 2B illustrates a confidence value check unit that controls throughput through an error-controlled process based on the adjustment of a confidence value threshold and corresponding error rate in accordance with the aspects of the disclosure.

An embodiment of the CV check unit 120 may be as shown in FIG. 2B. The CV check unit 120 can include a confidence value comparator 216, feedthrough unit 220, and an output director 232. The confidence value comparator 216 can check or compare the confidence value, provided by the CV generator 208, against some predetermined confidence value threshold. The predetermined confidence value threshold may be provided by input 228 from a user, may be set as a standard threshold, as required by the process conducted by the processing units 116/124, or may be provided possibly by a third-party. The failure or success of the comparison from the CV comparator 216 may be provided to the feedthrough unit 220.

The feedthrough unit 220 may throttle the throughput based on changes to the confidence value threshold in response to demand and other inputs. For example, the feedthrough unit 220 can receive a throughput requirement or suggestion 224. This throughput input 224 can be some type of user input or requirement provided through a user interface, for example, the user interface shown in FIG. 4, or through other input. The throughput 224 may suggest that, during some time period, the throughput must be increased or decreased based on demand.

Figure 4:
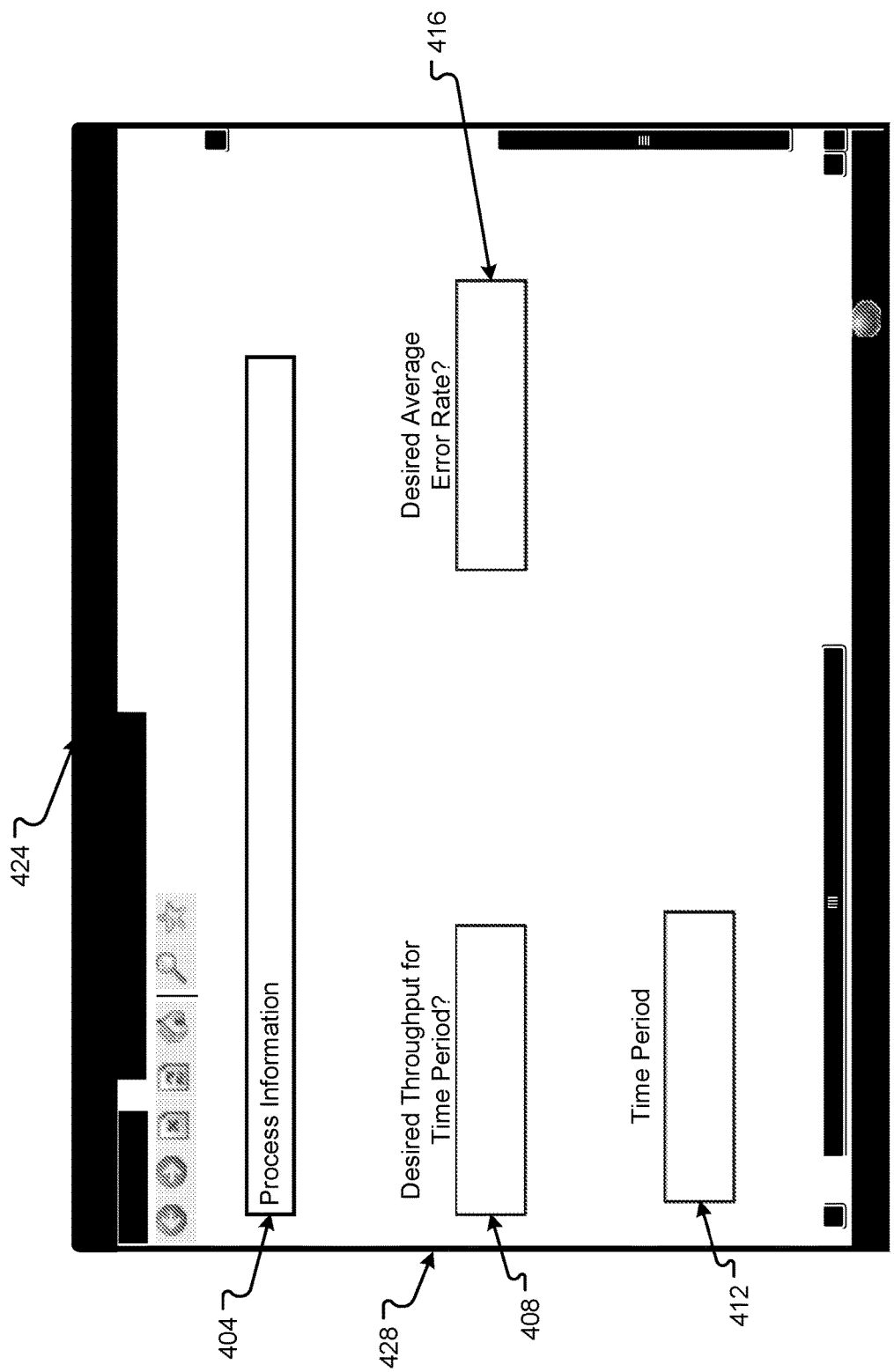
FIG. 4 illustrates a user interface that receives parameter information for an error-controlled process in accordance with the aspects of the disclosure.

In alternative or additional configurations, an error rate suggestion/confidence value threshold input 228 may also be provided to the feedthrough unit 220. Similarly, the input 228 can be provided by a user or be required by some system or third-party, based on demand, and provided through a user interface, as shown in FIG. 4, or other communication or input interface. The input 228 can adjust a throughput and vice versa based on the requirements of the system to meet all the parameters, as described above. Based on these types of inputs, the feedthrough unit 220 can adjust the predetermined CV threshold for the CV comparator 216 to allow for a greater number of results from the analyzer 204 to be sent through to the output director 232. In other words, those results that would have been rejected when the CV was compared to a higher threshold, will now be passed through as passing the comparison with the lower CV threshold.

The output director 232 can direct the output 236 from the feedthrough unit 220 to output processing 112, when the CV is above the CV threshold. An additional processing director 234 can direct the additional processing output 238 for additional/reprocessing with the additional processor 124 or primary processor 116. Thus, the output director 232 and the additional processing director 234 direct the data from the CV check unit 120 to the appropriate follow-on processing based on the results and whether the CV is below the CV threshold.

An embodiment of data structure 300 that may contain the data, as provided by the initial/additional processing unit 116/124, may be as shown in FIG. 3A. The data structure 300 may include one or more fields such as a data field 304, a confidence value field 308, a bit set to require additional processing field 312, and/or a listing of the additional processing that may have been completed on the input 308, in field 316. There may be more or fewer fields in data structure 300, as represented by ellipses 340. Further, each input 108 may have an associated data structure 300. Thus, there may be more data structures 300 saved or processed than that shown in FIG. 3A, as represented by ellipses 344.

The data field 308 can include any information about the input 108 and/or result provided by the analyzer 204. Thus, the data 308 can include the original input, such as the written text or speech file. This analog or initial input may be stored or may have a link stored therein to locate or retrieve that original input data 108. The data 304 can also include the result, for example, the digitized version of the input (e.g., a digitized document or field of the document, a digitized speech input, a digitized video, etc.) or other type of output from the analyzer 204. Similarly, the result in the data field 304 may be a link to the data that may be stored elsewhere to minimize the size of the data packet 300.

The confidence value 308 may be the confidence value provided by the confidence value generator 208. Further, confidence value field 308 can also include the confidence value threshold that must be applied by the CV check unit 120. As such, all data needed for the CV comparator 216 may be included in the CV field 308.

The feedthrough unit 220 can include a binary decision as to whether further processing is required, in field 312. Thus, there may be a bit set either yes or no, by the output director 232. to determine whether additional or reprocessing is required. The feedthrough unit 220 may also provide what type of processing may be needed in field 316. Thus, based on the type of process being executed by the analyzer 204 on the input 108, the feedthrough unit 220 can determine the type of additional reprocessing and put that suggestion within field 316. The output director 232 and additional processing director 234 can then read the field 316 and send the result and input to the appropriate unit whether sent to the output processing 112, sent to the additional processing 124, or sent back to primary processing 116 for reprocessing.

Further, upon completion of the reprocessing or additional processing, what was done and the new resulting data, confidence value, etc. may be placed in the additional processing field 316. As such, there may be a chain of data provided, with the input and original result, to show changes and improvements in the quality of the result and thus an increase in the confidence value which may then indicate a non-error result to be sent to output processing 112. This process, executed by the analyzer 204, may be iterative, and thus, there may be several iterations that result in new confidence value(s) provided within the additional processing field 316 and the data structure 300.

A data structure 320 for establishing settings to be provided to or stored by the feedthrough unit 220 may be as shown in FIG. 3B. The data structure 320 can include one or more of, but is not limited to: what type of process is to be run by the analyzer 204 on the input, a confidence value setting or confidence value threshold 328, a throughput setting 332, and/or an error rate setting 336. There may be more or fewer fields in data structure 320, as represented by ellipses 348. Further, each process executed by the analyzer 104 may have an associated data structure 320. Thus, there may be more data structures 320 saved or processed than that shown in FIG. 3B, as represented by ellipses 352.

The processing field 324 can include the identifier (ID), which may be a name, a numeric identifier, an alphanumeric identifier, a globally unique identifier (GUID), or other information that identifies which processing these settings are to be applied. Thus, the analyzer 204 knows which processor or processing function is to be run and the feedthrough unit 220 can determine what settings to apply to said processes.

A confidence value (CV) threshold setting 228 can be the confidence value threshold provided to the CV comparator 216. Further, the CV threshold setting 228 can be a new setting or set of settings provided through or determined based on throughput input 224 or input 228. Thus, the feedthrough unit 220 can conduct analysis of the effect on the throughput based on how high or low the threshold for the confidence value should be to produce the required throughput based on demand or required by the error rate provided (as described as the tabular calculation above).

The throughput setting 332 can be what throughput is required by the feedthrough unit 220 or the suggestion provided by the throughput input 224. The throughput setting 332 can include a number of results per input that are output and believed to be without error by the processing units 116/124. The throughput, thus, can be a function of the number of outputs divided by the number of inputs. Further, the throughput setting 332 can be a number of outputs either over a time period or some type of rate.

The error rate setting 336 can be the error rate required by the CV check unit 120 or suggested through the input 228. An error rate 336 can be determined by the predicted number of predicted errors divided by the number of inputs 108. The error rate 336 can be provided either by the number of predicted errors or by the number of predicted successes. For example, an error rate setting can require 3% or fewer errors or 97% or greater successes. The error rate setting 336 can also be a function of the number of predicted results sent to additional processing 124, reprocessing through processor 116, etc.

An embodiment of a user interface 400 for providing inputs into the confidence value check unit 120 may be as shown in FIG. 4. The user interface 400 can include one or more user interface portions 404 through 416 which provide information or allow for user inputs through a user input device, such a mouse, keyboard, etc. In a first portion 404, the process name or information may be presented to the user. This information may include any type of information associated with data structures 300 or 320. The processing information 404 can provide enough information for the user to identify the process being conducted and may also include what type of changes may be made or the parameters required by the process. For example, processing portion 404 may display the process name or identifier number 324 and include the error rate setting 336, demand, result information, etc.

The desired throughput for a time period portion 408 can include a user interface input section to allow a user to enter a throughput number 332 (for a predetermined time period, which may be indicated in portion 412). This input can be a percentage, such as 120%, 80%, etc. or may be a number of items to be processed per time period. For example, the throughput can be 100 inputs per day, 100 inputs for the time period of day one in a time division, etc. The user may enter several different throughputs, one per time period in the time division, which may all be stored within the throughput settings 332.

The time period 412 can also include an ability to enter which time period in a time division to apply the settings. Thus, any change to the throughput, error rate, or confidence value in 408 can be applied to a particular time period 412. This time period may be general, for example, the first day of the time division, for example, Monday of each week, or some other type of generalization. Further, the time period 412 can provide precise days or time periods within a year or other type of time division. For example, there may be a setting specific to day 43 of a year or may be specific to a date, e.g., September 15th, etc. As such, the throughput can be adjusted based on historical trends and the demand on processing unit 104. These historical trends can be delineated by a time period either generally or within seasons, months, years, etc.

A desired average error rate portion 416 may provide user the ability to enter a desired average error rate 336. Thus, instead of providing throughput 408, the predicted average error rate 336 can be adjusted. For example, rather than have an error rate of 1%, the user may increase that error rate to 2%, for a particular time period 412, to attempt to achieve a desired throughput 408. The error rate 336 may be adjusted by a percentage or by number of errors per input, etc. In other configurations, the user can adjust the desired throughput in portion 408 but also specify the average error rate in portion 416 that is to be achieved over all time periods. As such, the user can control some throughput for a time period defined in portion 412, while the system maintains the average error rate by automatically adjusting error rates and throughput through other time periods.

Changing the throughput 408 and/or error rate 416 can change the desired confidence value threshold 328 used by the feedthrough unit 220. Thus, the threshold 328 can be any automatic setting, e.g., something above a 90% confidence value, a 95% confidence value, etc. This change can be based on the desired error rate 416 and can also change based on the throughput 408 for the time period 412 when the setting 408 is made. As shown in FIG. 4, any of these types of inputs may provide a throughput change with user interface 400. However, in other configurations, these settings may be changed automatically by the processor 104. Thus, depending on historical averages, demand, or types of other requirements, the processing unit 104 can adjust any of the parameters including, but not limited to, throughput, time period, confidence value threshold, error rate, or other settings automatically to achieve requirements as mandated by a user, a third party, or by the process being executed with these parameters.

It should be noted that any error rate described herein is a predicted error rate that may be based on analysis or past processing. The process herein are not inspecting the output results to determine or find errors.

An embodiment of a method 500 for providing an error-controlled process may be as shown in FIG. 5. A general order for the steps of the method 500 is shown in FIG. 5. Generally, the method 500 starts with a start operation 504 and ends with an end operation 536. The method 500 can include more or fewer steps or can arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an Application Specific Integrated Circuit (ASIC), a Field Programmable Gate Array (FPGA), a System-on-Chip (SOC), or other hardware device. Hereinafter, the method 500 shall be explained with reference to the systems, components, modules, software, data structures, user interfaces, methods, etc. described in conjunction with FIGS. 1-4 and 6-8.

In the method 500, the processing unit 104 can receive an input 108, in step 508. The input 108 can be some type of data, information, file, or other input to be analyzed by the error-controlled process. For example, the input 108 can be a document, an audio file, a video file, other multimedia data, a digital picture, etc. The input 108 can be received through user input, a communication system, from a memory or storage device, etc. The input 108 may be in a predetermined form or comply with a predetermined protocol for processing by the processing function 104. However, in some configurations, the input 108 may be converted into a compatible form by an Application Programming Interface (API) or other software interface. Further, the input 108 may be received from a hardware device, for example, a camera, a microphone, etc. Thus, the input 108 can be converted from analog to digital format for processing, or have another form of conversion applied to the input 108. This input 108 may then be provided to the primary processing unit 116 of the processing function 104.

The primary processor 116 can then process or conduct the error-controlled process on the input 108, in step 512. Several processes may be conducted on the same input 108 or a single process may be conducted. Which process is executed by the primary processing unit 116 can depend on the input 108, the desired output 128, or other requirements. The process may be, for example, some type of optical character recognition, voice recognition, face recognition, etc. on the input 108. The type of process is not limited to those discussed herein and may include other processes as would be understood by one skilled in the art. Based on the processing, the analyzer 204 can conduct the process to produce a result. Thus, the analyzer 204 analyzes the input 108 to produce some type of data or result 304. This result 304 may be provided to the confidence value generator 208.

The confidence value generator 208 may then determine the confidence value 308, in step 516. A confidence value 308 may be based on past processing success and known or predetermined limitations in the analysis of the analyzer 204. Regardless, the confidence value is a measure of the believed accuracy of the analyzer 204, which is monitored and determined by confidence value generator 208, which can set the confidence value 308 for the result 304. This confidence value 308 can be generated based on historic trends or any type of decision as to what the analyzer 204 believes is the correct output. Further, this confidence value 308 may then be sent to the output processor 212 to be packetized in data structure 300 to be sent to the CV check unit 120.

The CV check unit 120 can receive the data structure packet 300 from the processing unit 116. The confidence value comparator 216 may then compare the confidence value against the confidence value threshold as set in the confidence value settings 328 and data structure 320, in step 520. The confidence value comparator 216 can receive or extract the confidence value threshold from the confidence value threshold setting 328. A comparison may then be done between received confidence value 308 and the threshold from settings 328. The confidence value comparator 216 may then determine if the confidence value is less than the confidence value threshold. A rejection of the result occurs if the confidence value is not above (or below in some configurations) the threshold. If there is a predicted error, the process 500 may proceed YES from step 524 to optional step 528, or back to step 512 without optional step 528. If there is no error, the method 500 may proceed NO from step 524 to step 532.

If optional additional processing is required of the additional processor 124, by settings 312, the additional processing may be conducted by the additional processing unit 124, in step 528. The additional processing completed by the additional processing unit 124 may be similar to that processing conducted by the primary processor 116, as explained in conjunction with FIG. 2A, or may be a new process(es) possibly using different or the same resources. Regardless, if additional processing is done, then a new confidence value may be determined by re-accomplishing step 516. If optional step 528 is not done, the result may be rejected and the input may be sent back to the primary processor 116 to be reprocessed, as explained above in step 512.

If there is no rejection of the result, the feedthrough unit 220 may then provide information for data structure 300 and send the data structure 300 to the output processor 232, in step 532. Thus, the output processor director 232 may then send the result onto output processing 112 for provision to further processing and/or out to the user or user's system.

An embodiment of a method 600 for setting or changing the throughput of the processing unit 104 may be as shown in FIG. 6. A general order for the steps of the method 600 is shown in FIG. 6. Generally, the method 600 starts with a start operation 604 and ends with an end operation 636. The method 600 can include more or fewer steps or can arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, a FPGA, a SOC, or other hardware device. Hereinafter, the method 600 shall be explained with reference to the systems, components, modules, software, data structures, user interfaces, methods, etc. described in conjunction with FIGS. 1-5 and 7-8.

The feedthrough unit 220, of the CV check unit 120, may receive a change in a parameter, in step 608. Here, the user may enter a new throughput 408, for a desired time period 412 and/or a new average error rate 416, etc. in user interface 400. This input may be a throughput input 224, an input 228, etc. into the feedthrough unit 220. In other configurations, a change in demand or predicted change based on historical trends may be introduced as a throughput input 224, an input 228, etc. Regardless of the source, the feedthrough unit 220 receives a change to one or more parameters.

The feedthrough unit 220 then adjusts the confidence value check process for a particular time period, in step 612. For example, the feedthrough unit 220 can adjust the confidence value threshold 328 that is provided to the confidence value comparator 216 to check the confidence value. In other configurations, the throughput setting 332 or error rate setting 336 is changed. Regardless, these adjustments may then change the number of rejections of the result that may be generated by the confidence value comparator 216 or other unit(s) and thus increase the desired error rate (which can change the number of predicted errors that are passed downstream) but also change the throughput. Thus, the feedthrough unit 220 can change the throughput for the time period, in step 616.

After the time period expires, the feedthrough unit 220 can then reestablish or readjust the changed parameter, in step 620, for a next or previous time period to balance the equations described above. This adjustment is for another time period, different from the time period that required higher throughput, within the time division. Changing the error rate in this other time period can compensate for the higher number of predicted errors created in steps 612 and 616. This other change allows for the throughput to be throttled back and the error rate to change as outputs that need additional processing change or rejections to change to maintain an average error rate allowed over the entire time division. In this way, the feedthrough 220 can maintain the average error rate over the time division, but throttle the throughput based on the different time periods within a time division.

In some circumstances, the establishment of the parameter may be changed before the adjustment in step 612 and 616. In other words, if a higher throughput is needed in a time period later in a time division, as such, the error rate may be changed and throughput change in an earlier time period within the time division to compensate for what will come in adjusting the error rate to change the throughput in a later time period.

The feedthrough unit 220 then maintains an error rate over the entire time division, in step 624. By adjusting the error rate and throughput within different time periods in the time division, the feedthrough unit 220 can maintain an average error rate for the complete time division. For example, by maintaining the amount of processing, the time division period, and the average error rate over a time division, but changing the error rate in smaller portions of the time division, the feedthrough unit 220 can adjust the amount of total throughput during high demand periods for the processing unit 104 and still meet requirements for average error rate.

Figure 7:
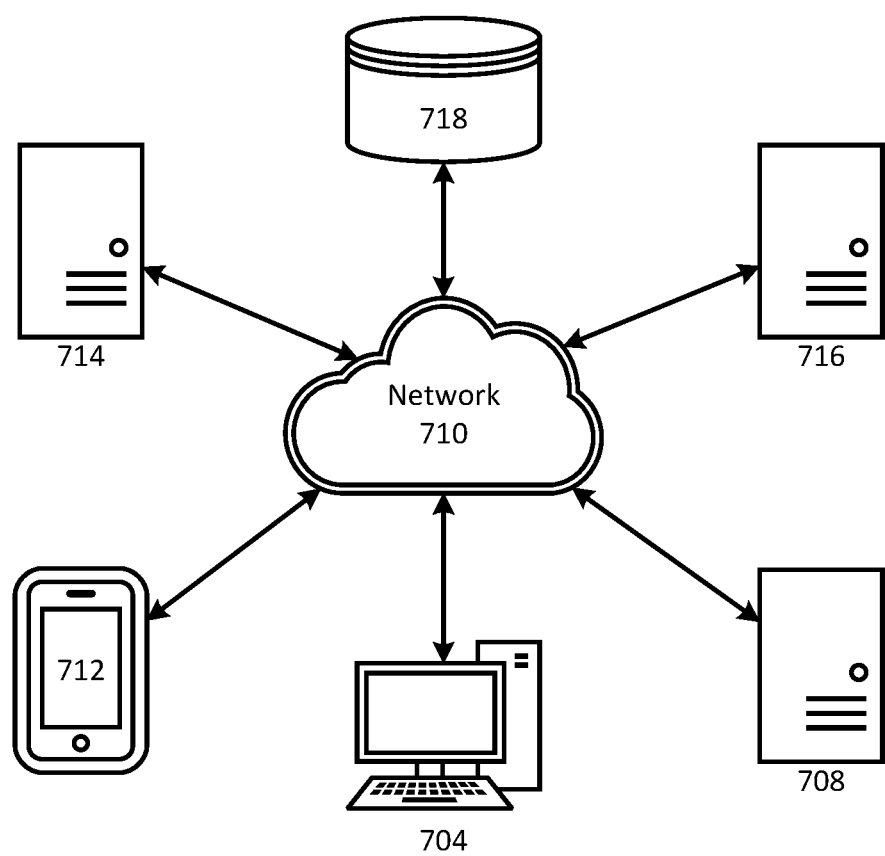
FIG. 7 illustrates an example of a computing environment associated with the systems and methods herein in accordance with the aspects of the disclosure.

FIG. 7 illustrates a block diagram of a computing environment 700 that may function as the servers, user computers, or other systems provided and described herein. The computing environment 700 includes one or more user computers, servers, or computing devices, such as an mobile device 712. The computing devices 704, 708, 712 may include general purpose personal computers (including, merely by way of example, personal computers, and/or laptop computers running various versions of Microsoft Corp.'s Windows® and/or Apple Corp.'s Macintosh® operating systems), servers, and/or workstation computers running any of a variety of commercially-available UNIX® or UNIX-like operating systems. These computing devices 704, 708, 712 may also have any of a variety of applications, including for example, database client and/or server applications, and web browser applications. Alternatively, the computing devices 704, 708, 712 may be any other electronic device, such as a thin-client computer, Internet-enabled mobile telephone, and/or personal digital assistant, capable of communicating via a network 710 and/or displaying and navigating web pages or other types of electronic documents or information. Although the exemplary computing environment 700 is shown with two computing devices, any number of user computers or computing devices may be supported.

The computing environment 700 may also include one or more servers 714, 716. In this example, server 714 is shown as a web server and server 716 is shown as an application server. The web server 714, which may be used to process requests for web pages or other electronic documents from computing devices 704, 708, 712. The web server 714 can be running an operating system including any of those discussed above, as well as any commercially-available server operating systems. The web server 714 can also run a variety of server applications, including SIP (Session Initiation Protocol) servers, HTTP(s) servers, FTP servers, CGI servers, database servers, Java® servers, and the like. In some instances, the web server 714 may publish operations available operations as one or more web services.

The computing environment 700 may also include one or more file and or/application servers 716, which can, in addition to an operating system, include one or more applications accessible by a client running on one or more of the computing devices 704, 708, 712. The server(s) 716 and/or 714 may be one or more general purpose computers capable of executing programs or scripts in response to the computing devices 704, 708, 712. As one example, the server 716, 714 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 716 may also include database servers, including without limitation those commercially available from Oracle®, Microsoft®, Sybase®, IBM® and the like, which can process requests from database clients running on a computing device 704, 708, 712.

The web pages created by the server 714 and/or 716 may be forwarded to a computing device 704, 708, 712 via a web (file) server 714, 716. Similarly, the web server 714 may be able to receive web page requests, web services invocations, and/or input data from a computing device 704, 708, 712 (e.g., a user computer, etc.) and can forward the web page requests and/or input data to the web (application) server 716. In further embodiments, the server 716 may function as a file server. Although for ease of description, FIG. 7 illustrates a separate web server 714 and file/application server 716, those skilled in the art will recognize that the functions described with respect to servers 714, 716 may be performed by a single server and/or a plurality of specialized servers, depending on implementation-specific needs and parameters. The computer systems 704, 708, 712, web (file) server 714 and/or web (application) server 716 may function as the system, devices, or components described in FIGS. 1-12.

The computing environment 700 may also include a database 718. The database 718 may reside in a variety of locations. By way of example, database 718 may reside on a storage medium local to (and/or resident in) one or more of the computers 704, 708, 712, 714, 716. Alternatively, it may be remote from any or all of the computers 704, 708, 712, 714, 716, and in communication (e.g., via the network 352) with one or more of these. The database 718 may reside in a storage-area network ("SAN") familiar to those skilled in the art. Similarly, any necessary files for performing the functions attributed to the computers 704, 708, 712, 714, 716 may be stored locally on the respective computer and/or remotely, as appropriate. The database 718 may be a relational database, such as Oracle 20i®, that is adapted to store, update, and retrieve data in response to SQL-formatted commands.

Figure 8:
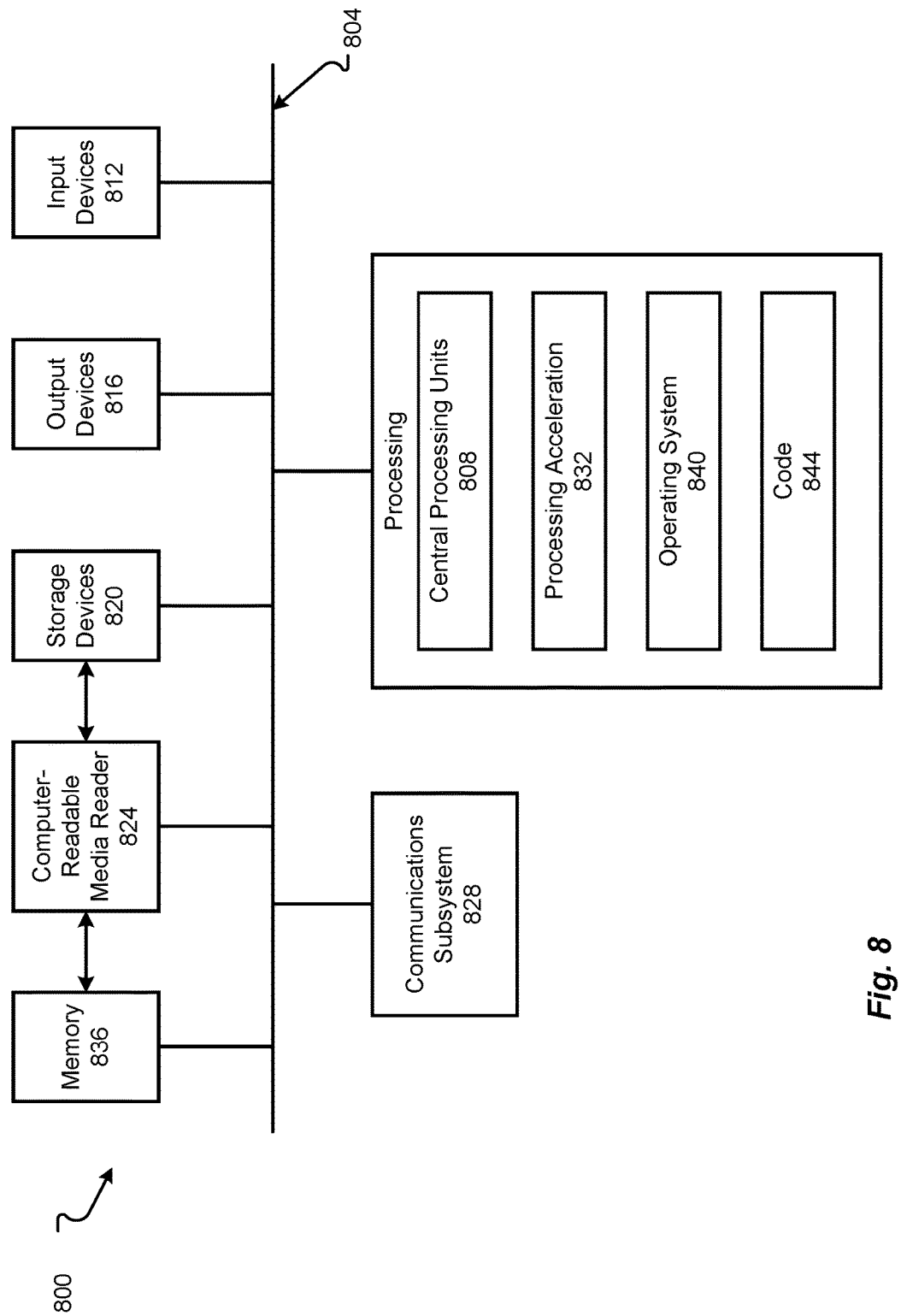
FIG. 8 illustrates an example of a computing device associated with the systems and methods herein in accordance with the aspects of the disclosure.

FIG. 8 illustrates one embodiment of a computer system 800 upon which the servers, user computers, computing devices, or other systems or components described above may be deployed or executed. The computer system 800 is shown comprising hardware elements that may be electrically coupled via a bus 804. The hardware elements may include one or more central processing units (CPUs) 808; one or more input devices 812 (e.g., a mouse, a keyboard, etc.); and one or more output devices 816 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable, and/or the like.

The computer system 800 may additionally include a computer-readable storage media reader 824; a communications system 828 (e.g., a modem, a network card (wireless or wired), an infra-red communication device, etc.); and working memory 836, which may include RAM and ROM devices as described above. The computer system 800 may also include a processing acceleration unit 832, which can include a digital signal processor (DSP), a special-purpose processor, and/or the like.

The computer-readable storage media reader 824 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 828 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 836, including an operating system 840 and/or other code 844. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 808 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably and are open ended.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects or examples provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

An aspect of the disclosure comprises a method for balancing resources, the method comprising: receiving at least a first task and a second task, during a time division, for an error-controlled process executed by a processor, wherein the time division is separated into a first time period and a second time period, wherein the first task is processed in the first time period and the second task is processed in the second time period; changing an error rate for the error-controlled process for the first time period, wherein changing the error rate modifies a first throughput of the error-controlled process; and changing the error rate for the second time period to maintain an average error rate over the time division.

Any of the one or more above aspects, wherein the error-controlled process is a computer-based analysis, wherein the computer-based analysis generates a result and a confidence value.

Any of the one or more above aspects, wherein an error is not discovered during the error-controlled process.

Any of the one or more above aspects, wherein the error rate is a number of predicted errors divided a number of error-controlled processes executed by the processor, and wherein the error rate is predicted from past processing.

Any of the one or more above aspects, wherein the error rate is adjusted by changing the predetermined threshold.

Any of the one or more above aspects, wherein increasing the predicted error rate increases the throughput.

Any of the one or more above aspects, wherein a first number of tasks occurring in the first time period is greater than a second number of tasks occurring in the second time period.

Any of the one or more above aspects, wherein the time division is a week and the first time period is a day.

Any of the one or more above aspects, wherein a turnaround to provide the result for the first task and second task is predetermined.

Any of the one or more above aspects, wherein the turnaround is fixed.

Any of the one or more above aspects, wherein the turnaround prevents the first task from being processed in the second time period.

Any of the one or more above aspects, wherein an amount of processing capacity for the processor to process at least the first task and the second task is fixed.

Any of the one or more above aspects, wherein the result is separated into a first portion and a second portion.

Any of the one or more above aspects, wherein a first confidence value threshold is provided for a first portion of the result and a second confidence value threshold is provided for a second portion of the result.

Any of the one or more above aspects, wherein the first confidence value threshold, the second confidence value threshold, or both the first confidence value threshold and the second confidence value threshold predict whether an error is in the result.

Any of the one or more above aspects, wherein, if a first task fails a comparison of the confidence value to the confidence value threshold, the first task undergoes reprocessing to produce a second result that reduces a probability of an error.

Any of the one or more above aspects, wherein a number of past tasks that required reprocessing determines the predicted error rate.

Any of the one or more above aspects, wherein a trigger to change the error rate is determined by a past processing event for tasks received during a similar time division in the past.

Another aspect of the disclosure comprises a non-transitory computer readable medium having stored thereon instructions, which when by a processor cause the processor to execute a method for balancing resources, the method comprising: receiving at least a first task and a second task, during a time division, for an error-controlled process executed by a processor, wherein the time division is separated into a first time period and a second time period, wherein the first task is processed in the first time period and the second task is processed in the second time period, wherein the error-controlled process is a computer-based analysis, and wherein the computer-based analysis generates a result and a confidence value; changing a predicted error rate for the error-controlled process for the first time period, wherein changing the predicted error rate modifies a first throughput of the error-controlled process, and wherein the predicted error rate is adjusted by changing a confidence value threshold; changing the predicted error rate for the second time period to maintain an average predicted error rate over the time division, wherein a turnaround to provide the result for the first task and second task is predetermined, wherein the turnaround is fixed, and wherein the turnaround prevents the first task from being processed in the second time period; and wherein an amount of processing capacity for the processor to process at least the first task and the second task is fixed.

Another aspect of the disclosure comprises a system comprising: a memory; a processor in communication with the memory, wherein an amount of processing capacity for the processor to process a task is fixed, the processor executing: a processing function that: receives at least a first task and a second task, during a time division, conducts an error-controlled process on at least the first task and the second task, wherein the time division is separated into a first time period and a second time period, wherein the first task is processed in the first time period and the second task is processed in the second time period, wherein the processing function generates a result and a confidence value; and a confidence value check unit that: changes a first error rate for the error-controlled process for the first time period, wherein changing the first error rate modifies a first throughput of the error-controlled process, and wherein the error rate is adjusted by changing a confidence value threshold used to compare to the confidence value; and changes a second error rate for the second time period to maintain an average error rate over the time division, wherein a turnaround to provide the result for the first task and second task is predetermined, wherein the turnaround is fixed, and wherein the turnaround prevents the first task from being processed in the second time period.

Any of the one or more above aspects as described herein.

Any of the one or more above aspects in combination with any of the one or more other above aspects.

What is claimed is:

1. A method for balancing resources, the method comprising:
   receiving at least a first task and a second task, during a time division, for an error-controlled process executed by a processor, wherein the time division is separated into a first time period and a second time period, wherein the first task is processed in the first time period and the second task is processed in the second time period;
   changing an error rate for the error-controlled process for the first time period, wherein changing the error rate modifies a first throughput of the error-controlled process; and
   changing the error rate for the second time period to maintain an average error rate over the time division.

2. The method of claim 1, wherein the error-controlled process is a computer-based analysis, wherein the computer-based analysis generates a result and a confidence value.

3. The method of claim 2, wherein an error is not discovered during the error-controlled process.

4. The method of claim 3, wherein the error rate is a number of predicted errors divided a number of error-controlled processes executed by the processor, and wherein the error rate is predicted from past processing.

5. The method of claim 4, wherein the error rate is adjusted by changing the predetermined threshold.

6. The method of claim 5, wherein increasing the predicted error rate increases the throughput.

7. The method of claim 6, wherein a first number of tasks occurring in the first time period is greater than a second number of tasks occurring in the second time period.

8. The method of claim 7, wherein the time division is a week and the first time period is a day.

9. The method of claim 8, wherein a turnaround to provide the result for the first task and second task is predetermined.

10. The method of claim 9, wherein the turnaround is fixed.

11. The method of claim 10, wherein the turnaround prevents the first task from being processed in the second time period.

12. The method of claim 11, wherein an amount of processing capacity for the processor to process at least the first task and the second task is fixed.

13. The method of claim 12, wherein the result is separated into a first portion and a second portion.

14. The method of claim 13, wherein a first confidence value threshold is provided for a first portion of the result and a second confidence value threshold is provided for a second portion of the result.

15. The method of claim 14, wherein the first confidence value threshold, the second confidence value threshold, or both the first confidence value threshold and the second confidence value threshold estimates whether an error may be in the result based on past analysis.

16. The method of claim 1, wherein, if a first task fails a comparison of the confidence value to the confidence value threshold, the first task undergoes reprocessing to produce a second result that reduces a probability of an error.

17. The method of claim 16, wherein a number of past tasks that required reprocessing determines the predicted error rate.

18. The method of claim 1, wherein a trigger to change the error rate is determined by a past processing event for tasks received during a similar time division in the past.

19. A non-transitory computer readable medium having stored thereon instructions, which when by a processor cause the processor to execute a method for balancing resources, the method comprising:
   receiving at least a first task and a second task, during a time division, for an error-controlled process executed by a processor, wherein the time division is separated into a first time period and a second time period, wherein the first task is processed in the first time period and the second task is processed in the second time period, wherein the error-controlled process is a computer-based analysis, and wherein the computer-based analysis generates a result and a confidence value;

changing a predicted error rate for the error-controlled process for the first time period, wherein changing the predicted error rate modifies a first throughput of the error-controlled process, and wherein the predicted error rate is adjusted by changing a confidence value threshold; and changing the predicted error rate for the second time period to maintain an average predicted error rate over the time division, wherein a turnaround to provide the result for the first task and second task is predetermined, wherein the turnaround is fixed, and wherein the turnaround prevents the first task from being processed in the second time period.

20. A system comprising:

a memory;

a processor in communication with the memory, wherein an amount of processing capacity for the processor to process a task is fixed, the processor executing:

a processing function that:
receives at least a first task and a second task, during a time division,
conducts an error-controlled process on at least the first task and the second task, wherein the time division is separated into a first time period and a second time period, wherein the first task is processed in the first time period and the second task is processed in the second time period, wherein the processing function generates a result and a confidence value; and a confidence value check unit that:
changes a first error rate for the error-controlled process for the first time period, wherein changing the first error rate modifies a first throughput of the error-controlled process, and wherein the error rate is adjusted by changing a confidence value threshold used to compare to the confidence value; and
changes a second error rate for the second time period to maintain an average error rate over the time division, wherein a turnaround to provide the result for the first task and second task is predetermined, wherein the turnaround is fixed, and wherein the turnaround prevents the first task from being processed in the second time period.

* * * * *